(12) United States Patent
Liu et al.

(10) Patent No.: US 11,205,841 B2
(45) Date of Patent: Dec. 21, 2021

(54) ANTENNA ASSEMBLY FOR COMMUNICATING WITH UNMANNED AERIAL VEHICLE (UAV) AND UAV SYSTEM

(71) Applicant: SZ DJI TECHNOLOGY CO., LTD., Shenzhen (CN)

(72) Inventors: Yong Liu, Shenzhen (CN); Shanguang Guo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 18 days.

(21) Appl. No.: 16/654,907

(22) Filed: Oct. 16, 2019

(65) Prior Publication Data

US 2020/0052389 A1 Feb. 13, 2020

Related U.S. Application Data

(63) Continuation of application No. PCT/CN2017/081495, filed on Apr. 21, 2017.

(51) Int. Cl.
| | |
|---|---|
| G05D 1/10 | (2006.01) |
| H01Q 3/08 | (2006.01) |
| G05D 1/08 | (2006.01) |
| H01Q 1/28 | (2006.01) |

(52) U.S. Cl.
CPC ............. *H01Q 3/08* (2013.01); *G05D 1/0808* (2013.01); *H01Q 1/28* (2013.01)

(58) Field of Classification Search
CPC .. H01Q 3/08; H01Q 1/28; H01Q 1/18; H01Q 1/08; H01Q 1/12; G05D 1/0808
See application file for complete search history.

(56) References Cited

U.S. PATENT DOCUMENTS

| | | | | |
|---|---|---|---|---|
| 3,893,123 A | * | 7/1975 | Bieser | ..... H01Q 1/18 343/706 |
| 4,020,491 A | * | 4/1977 | Bieser | ..... F16F 15/02 343/765 |
| 4,223,259 A | * | 9/1980 | Ernsberger | ..... H01Q 1/18 318/648 |
| 4,399,714 A | * | 8/1983 | Barker | ..... G01C 19/26 74/5.1 |
| 4,433,337 A | * | 2/1984 | Smith | ..... H01Q 1/18 343/709 |

(Continued)

FOREIGN PATENT DOCUMENTS

| | | |
|---|---|---|
| CN | 101777695 A | 7/2010 |
| CN | 101814654 A | 8/2010 |

(Continued)

OTHER PUBLICATIONS

The World Intellectual Property Organization (WIPO) International Search Report for PCT/CN2017/081495 dated Jan. 26, 2018 5 pages.

(Continued)

*Primary Examiner* — Dimary S Lopez Cruz
*Assistant Examiner* — Bamidele A Jegede
(74) *Attorney, Agent, or Firm* — Anova Law Group, PLLC

(57) ABSTRACT

An antenna assembly includes a base, a gimbal disposed at the base, an antenna disposed at the gimbal, and a mainboard configured to control an attitude of the gimbal to control a radiation direction of the antenna.

19 Claims, 4 Drawing Sheets

(56) References Cited

U.S. PATENT DOCUMENTS

| | | | | |
|---|---|---|---|---|
| 4,621,266 A * | 11/1986 | Le Gall | | H01Q 1/18 342/359 |
| 5,202,695 A * | 4/1993 | Hollandsworth | | H01Q 1/18 244/3.16 |
| 5,922,039 A * | 7/1999 | Welch | | H01Q 1/34 280/5.507 |
| 6,023,247 A | 2/2000 | Rodeffer | | |
| 6,198,452 B1 * | 3/2001 | Beheler | | H01Q 1/18 343/757 |
| 6,262,687 B1 * | 7/2001 | Bai | | H01Q 1/125 343/757 |
| 6,285,338 B1 * | 9/2001 | Bai | | H01Q 3/08 343/880 |
| 6,441,800 B1 * | 8/2002 | Chan | | H01Q 1/18 244/172.6 |
| 7,411,561 B1 * | 8/2008 | Baldauf | | H01Q 19/192 343/761 |
| 9,450,286 B1 * | 9/2016 | Guerre | | H01Q 1/18 |
| 2010/0149059 A1 * | 6/2010 | Patel | | H01Q 1/005 343/765 |
| 2012/0200703 A1 * | 8/2012 | Nadir | | H04N 5/232 348/144 |
| 2013/0092852 A1 * | 4/2013 | Baumatz | | G01S 7/48 250/578.1 |
| 2013/0321197 A1 * | 12/2013 | Klingler | | G01S 7/4026 342/174 |
| 2014/0174214 A1 * | 6/2014 | Horth | | H01Q 1/288 74/25 |
| 2014/0266887 A1 * | 9/2014 | Blase | | H01Q 3/08 342/359 |
| 2014/0299734 A1 * | 10/2014 | Nielsen | | H01Q 1/18 248/560 |
| 2016/0216072 A1 * | 7/2016 | McNeil | | F41G 3/02 |
| 2017/0090481 A1 * | 3/2017 | Clark | | E04H 15/50 |
| 2017/0300717 A1 * | 10/2017 | Hu | | H04B 7/0608 |
| 2019/0013578 A1 * | 1/2019 | Ni | | H01Q 3/06 |
| 2019/0341670 A1 * | 11/2019 | Blennius | | H01Q 1/3216 |

FOREIGN PATENT DOCUMENTS

| | | |
|---|---|---|
| CN | 201803069 U | 4/2011 |
| CN | 103022696 A | 4/2013 |
| CN | 103138050 A | 6/2013 |
| CN | 103474773 A | 12/2013 |
| CN | 203415685 U | 1/2014 |
| CN | 103746186 A | 4/2014 |
| CN | 104391508 A | 3/2015 |
| CN | 105281017 A | 1/2016 |
| CN | 204991931 U | 1/2016 |
| CN | 105556410 A | 5/2016 |
| CN | 105763651 A | 7/2016 |
| CN | 105892492 A | 8/2016 |
| CN | 205452528 U | 8/2016 |
| CN | 205666336 U | 10/2016 |
| CN | 205863377 U | 1/2017 |
| CN | 205944429 U | 2/2017 |
| WO | 2016045009 A1 | 3/2016 |

OTHER PUBLICATIONS

Brian J. Smith et al., "Sliding Mode Control in a Two Axis Gimbal System", 1999 IEEE Aerospace Conference, Dec. 31, 1999, p457-470.

Mengdan CUI, "Servo PIZ Antenna Control System Based on STM32", Digital Technology and Application, vol. 2. Feb. 2016.

* cited by examiner

ANTENNA ASSEMBLY FOR COMMUNICATING WITH UNMANNED AERIAL VEHICLE (UAV) AND UAV SYSTEM

CROSS-REFERENCE TO RELATED APPLICATION

This application is a continuation of International Application No. PCT/CN2017/081495, filed on Apr. 21, 2017, the entire content of which is incorporated herein by reference.

TECHNICAL FIELD

The present disclosure relates to the field of unmanned aerial vehicle and, more particularly, to an antenna assembly for unmanned aerial vehicle (UAV) communication and a UAV system.

BACKGROUND

With the rapid development of the UAV industry, the UAVs are widely used in aerial photography, power grid inspection, dam inspection, fire rescue, and earthquake search and rescue, etc. As science and technology advance rapidly, more and more unknown fields need to be developed. More dangerous work and work environment require the work replacement of human by the UAV. Thus, requirements for longer communication distance and better communication quality between the UAV and remote controller thereof are getting more and more stringent.

An antenna device is a critical component for signal transmission between the UAV and the remote controller. The antenna device is used to transmit control signals of the remote controller to the UAV or to receive data signals returned by the UAV. To a large extent, the antenna device determines the communication distance and the communication quality between the UAV and the remote controller.

However, relevant products in the existing technology for improving the communication quality or increasing the communication distance between the UAV and the remote controller have the problems of unsuitable frequency band for signal transmission between the UAV and the remote controller or un-adjustable antenna attitude. Thus, the relevant products are ineffective in increasing the communication distance between the UAV and the remote controller or improving the poor communication quality between the UAV and the remote controller at a long distance.

SUMMARY

In accordance with the disclosure, there is provided an antenna assembly including a base, a gimbal disposed at the base, an antenna disposed at the gimbal, and a mainboard configured to control an attitude of the gimbal to control a radiation direction of the antenna.

Also in accordance with the disclosure, there is provided an unmanned aerial vehicle (UAV) system including a UAV, an external device, and an antenna assembly. The antenna assembly includes a base, a gimbal disposed at the base, an antenna disposed at the gimbal, and a mainboard configured to control an attitude of the gimbal to aim a radiation direction of the antenna towards the UAV. The external device is configured to send a control signal to the antenna assembly. The antenna assembly is configured to process the control signal and send the processed control signal to the UAV. The UAV is configured to execute flight operation according to the processed control signal.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
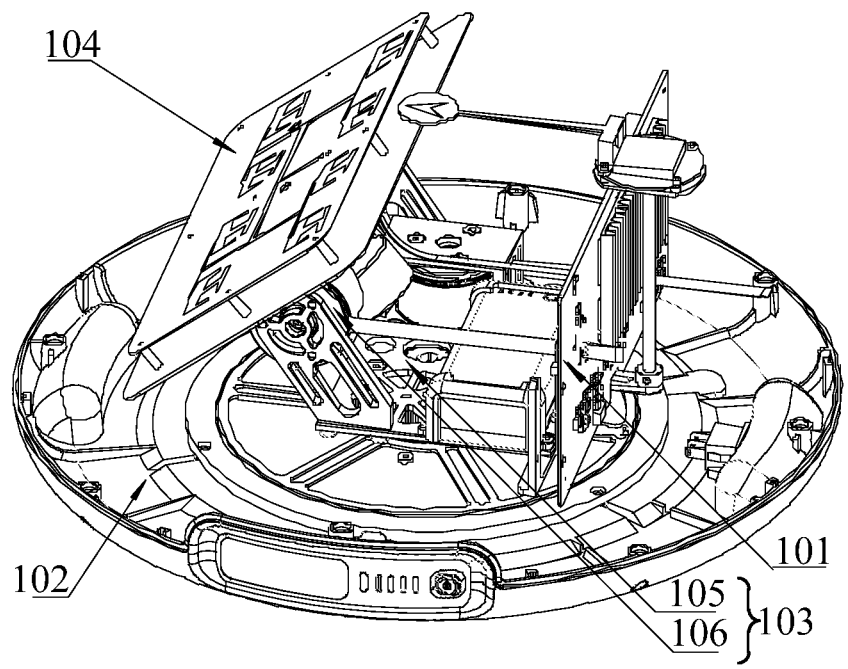
FIG. 1 is a schematic view of an antenna assembly for communication with unmanned aerial vehicle (UAV) according to an example embodiment of the present disclosure.

FIG. 1 is a schematic view of an antenna assembly for communicating with unmanned aerial vehicle (UAV) according to an example embodiment of the present disclosure. As shown in FIG. 1, the antenna assembly includes a mainboard 101, a base 102, a gimbal 103, and an antenna 104. The gimbal 103 is disposed at the base 102. The antenna 104 is disposed at the gimbal 103. The mainboard 101 is configured to control attitude of the gimbal 103 to aim a radiation direction of the antenna 104 toward an unmanned aerial vehicle (UAV).

To increase the communication distance of the UAV, an intensity of the communication signal of the UAV may be increased to ensure the communication quality of the UAV. In some embodiments, the signal radiation direction of the antenna 104 is directed toward the UAV to increase the intensity of the signal. In one application scenario, the communication signal may be amplified by an integrated power amplifier disposed inside the antenna assembly to increase the intensity of the communication signal. UAV communication includes, but is not limited to, data transmission of images and videos, and transmission of control instructions.

Different form the existing technology, the antenna assembly provided by the embodiments of the present disclosure adjusts the radiation direction of the antenna 104 through the gimbal 103 to aim the radiation direction toward the UAV, thereby increasing the intensity of the communication signal of the UAV, increasing the communication distance of the UAV, and improving the communication quality of long-distance communication of the UAV.

In some embodiments, the antenna assembly is further used to communicate with an external device. The external device is configured to transmit a control signal to the antenna assembly. The antenna assembly transmits the control signal to the UAV. Further, the antenna assembly amplifies the control signal from the external device before transmitting the control signal to the UAV. The amplified control signal is then transmitted to the UAV. Further, the mainboard 101 of the antenna assembly may control the attitude of the gimbal 103 to aim the radiation direction of the antenna 104 toward the UAV.

In some embodiments, the external device may be configured to receive an image signal from the UAV through the antenna assembly. The UAV transmits the image signal to the antenna assembly. The antenna assembly amplifies the image signal and then transmits the amplified image signal to the external device. Further, the UAV may include at least one imaging device (e.g., a camera).

In some embodiments, the external device includes, but is not limited to, a remote controller, a wristband, a watch, VR glasses, a mobile phone, a tablet computer, or any combination thereof.

In some embodiments, connection between the antenna assembly and the external device is wired or wireless.

In some embodiments, the antenna assembly further includes an inertial measurement unit (IMU, not shown), configured to measure the current attitude of the gimbal 103. Based on the current attitude, the mainboard 101 can control the gimbal 103 to be in a target attitude to adjust the radiation direction of the antenna 104 toward the UAV In some embodiments, the gimbal 103 includes a yaw axis assembly 105 and a pitch axis assembly 106. The yaw axis assembly is disposed at the base 102. The pitch axis assembly 106 and the mainboard 101 are both disposed at the yaw axis assembly 105. The pitch axis assembly 106 is configured to support the antenna 104. The attitude of the gimbal 103 includes a yaw angle of the yaw axis assembly 105 and a pitch angle of the pitch axis assembly 106. The yaw axis assembly 105 rotates around a yaw axis to adjust the yaw angle. The pitch axis assembly 106 rotates around a pitch axis to adjust the pitch angle. The yaw angle and the pitch angle are adjusted in real time by the yaw axis assembly 105 and the pitch axis assembly 106, respectively. As such, the radiation direction of the antenna 104 disposed at the gimbal 103 can be adjusted in real time to always aim the antenna 104 toward the UAV. When the communication signal between the UAV and the antenna assembly is interrupted, the IMU can measure the attitude of the gimbal 103, and the mainboard 101 can control the yaw axis assembly 105 and the pitch axis assembly 106 to rotate to search for the UAV (i.e., search for the communication signal) until the antenna assembly and the UAV re-establish the communication.

In some embodiments, the gimbal 103 further includes a roll axis assembly (not shown). The roll axis assembly may be disposed between the yaw axis assembly 105 and the pitch axis assembly 106. The roll axis assembly may include a roll axis electric motor. The attitude of the gimbal 103 further includes a roll angle of the roll axis assembly. The roll axis assembly may rotate around the roll axis to adjust the roll angle.

Figure 2A:
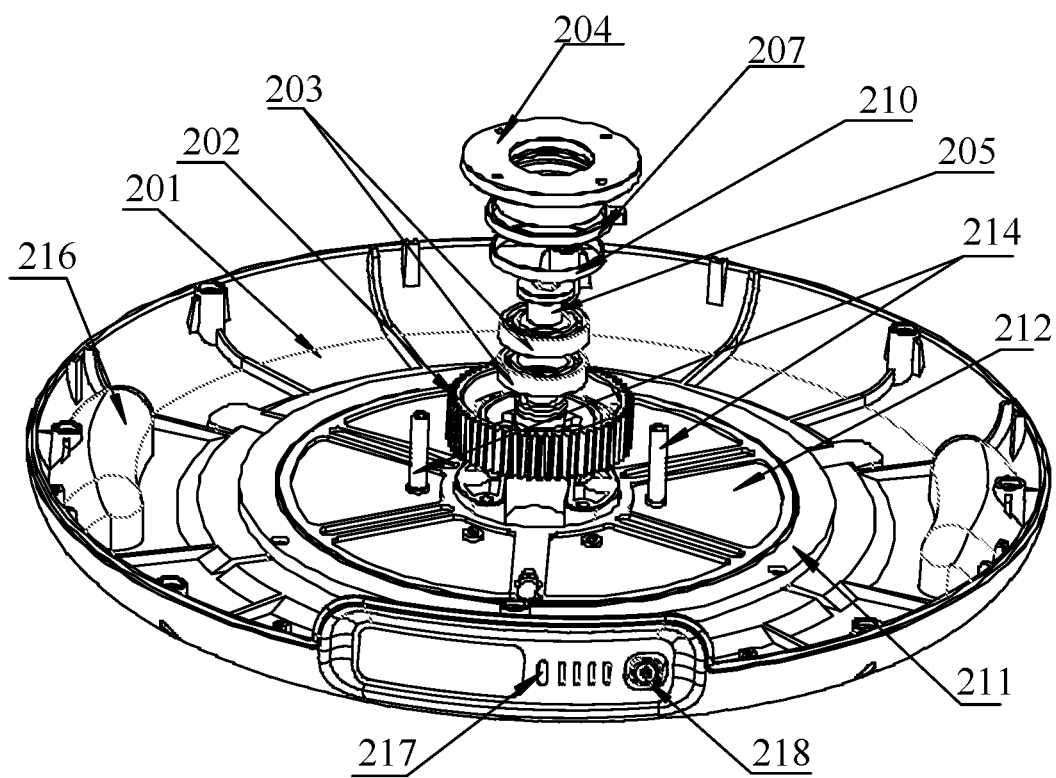
FIG. 2A is a schematic view of a base of the antenna assembly in FIG. 1.
Figure 2B:
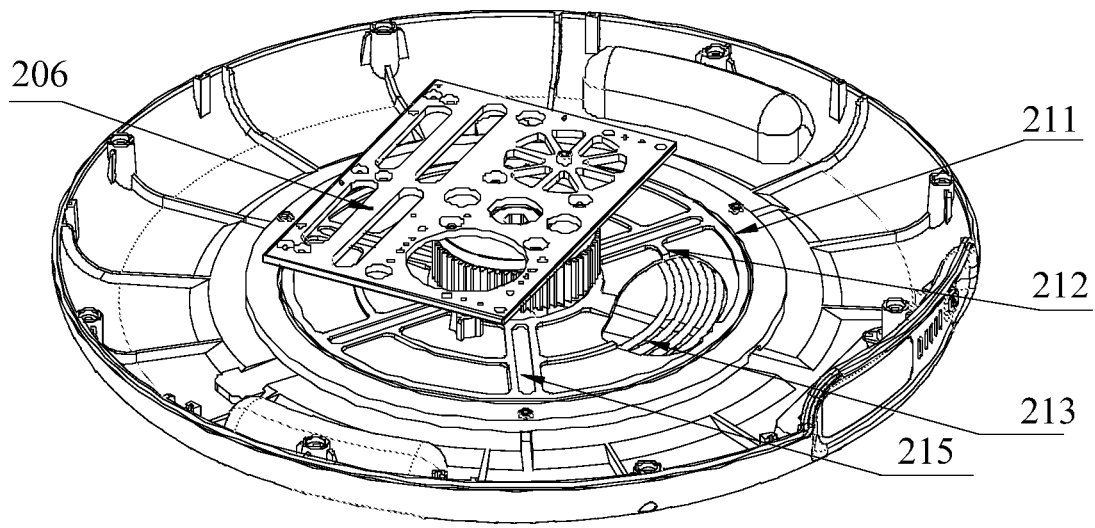
FIG. 2B is another schematic view of the base of the antenna assembly in FIG. 1.
Figure 2C:
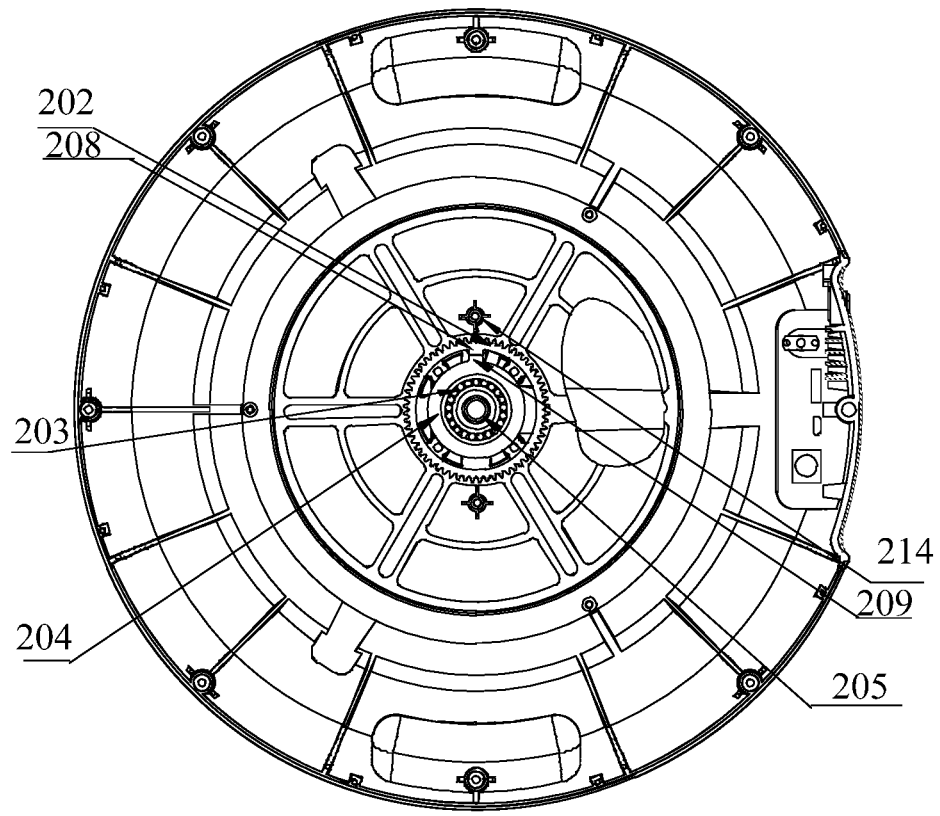
FIG. 2C is another schematic view of the base of the antenna assembly in FIG. 1.

FIGS. 2A-2C are schematic views of a base of the antenna assembly in FIG. 1. As shown in FIGS. 2A-2C, the base includes a housing 201, a first drive gear 202 and a bearing 203 fixedly disposed at the housing 201, and a bottom plate support member 204 rotatably supported by the bearing 203.

The bottom plate support member 204 may be, but is not limited to, a flange or a spring support member. The bottom plate support member 204 is configured to support the gimbal 103 disposed at the base 102 (referring to FIG. 1).

In some embodiments, the first drive gear 202 and the bearing 203 are coaxially disposed. In one application scenario, the bearing 203 is fixedly coupled to the first drive gear 202 by a bearing lock screw 205, such that the bearing 203 rotates as the first drive gear 202 rotates and separation of the yaw axis assembly 206 (referring to FIG. 2B, partially shown) from the base 101 (referring to FIG. 1) is prevented when the yaw axis assembly 206 rotates with the bearing 203.

In some embodiments, the base further includes a limit slip ring 207 disposed between the first drive gear 202 and the bottom plate support member 204. The limit slip ring 207 is configured to limit a rotation angle (i.e., a rotation range of the yaw angle) that the bottom plate support member 204 rotates relative to the first drive gear 202. In one application scenario, a boss (or protrusion) 208 is configured on the first drive gear 202. When rotating to a maximum yaw angle in one direction, the limit slip ring 207 hits the boss 208. Similarly, another boss 209 is configured on the bottom plate support ember 204. When the bottom plate support member 204 rotates to another maximum yaw angle in an opposite direction, the boss 209 hits the limit slip ring 207. As such, the first drive gear 202 and the bottom plate support member 204 rotate within a rotation angle range between two maximum yaw angles in two opposite directions.

In some embodiments, the base further includes an anti-friction slip ring 210 disposed between the limit slip ring 207 and the bottom plate support member 204 to increase wear resistance therebetween.

In some embodiments, the base further includes a feedline fixing platen 211 fixedly disposed at the housing 201 and a feedline rotating platen 212 rotationally disposed at the housing 201. The feedline rotating platen 212 rotates with the yaw axis assembly 206. The feedline fixing platen 211 and the feedline rotating platen 212 are coordinated to form a feedline receiving space (referring to FIG. 2B) to receive a feedline 213. During a process of rotating, the yaw axis assembly 206 drives the feedline rotating platen 212 and the feedline 213 to rotate synchronously. The rotation of the feedline 213 driven by the feedline rotating platen 212 addresses the problem that the loose feedline 213 interferes with movement of other structures.

In some embodiments, the base further includes a locking post 214 protrudingly disposed at the feedline rotating platen 212 and pointing toward the yaw axis assembly 206. The feedline rotating platen 212 rotates with the yaw axis assembly 206 through the locking post 214.

In some embodiments, the feedline rotating platen 212 includes a wiring hole 215 (referring to FIG. 2B). Through the wiring hole 215, the feedline 213 is electrically connected to the yaw axis assembly 206 and the mainboard 101 (referring to FIG. 1). In some other embodiments, through the wiring hole 215, the feedline 213 is connected to the external device to ensure stable and reliable signal transmission.

In some embodiments, the base further includes a bottom handle 216 for a user to hold the antenna assembly, an indicator 217 indicating operation status of the antenna assembly, and an on-off switch 218.

Figure 3:
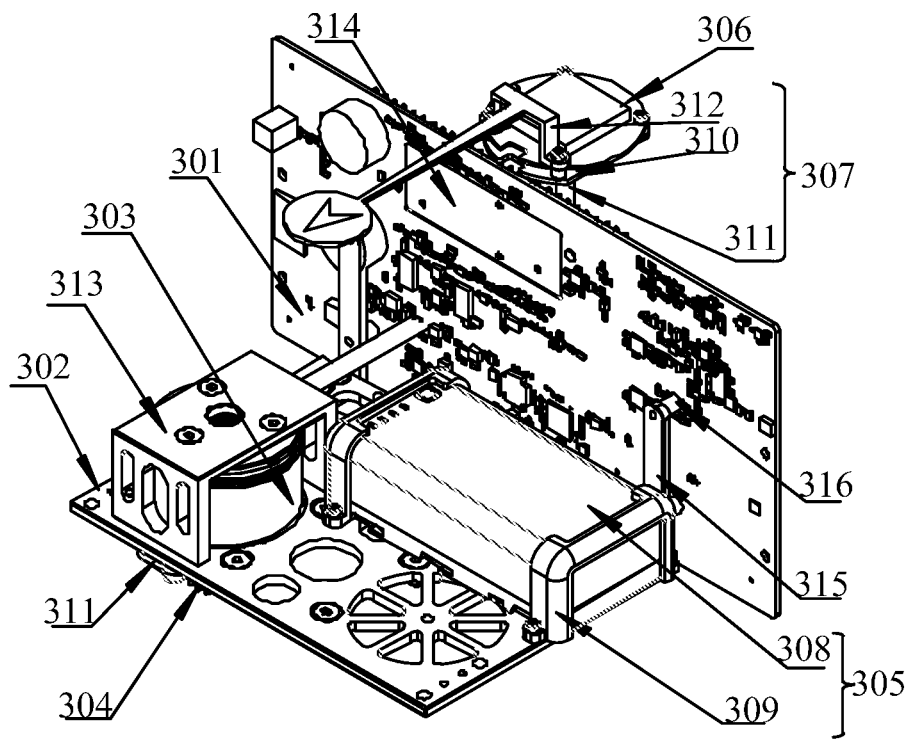
FIG. 3 is a schematic view of a yaw axis assembly and a mainboard of the gimbal in FIG. 1.

FIG. 3 is a schematic view of a yaw axis assembly and a mainboard of the gimbal in FIG. 1. The yaw axis assembly is configured to adjust the yaw angle of the gimbal under the control of the mainboard 301. The yaw axis assembly includes a first bottom plate 302, a yaw axis electric motor 303 disposed at the first bottom plate 302, and a second drive gear 304 driven by the yaw axis electric motor 303. The first bottom plate 302 is supported by the bottom plate support member 204 (referring to FIG. 2A). The second drive gear 304 engages with the first drive gear 202 (referring to FIG. 2A). As such, driven by the yaw axis electric motor 303, the bottom plate support member 204 and the first bottom plate 302 rotate relative to the housing 201 of the base and the first drive gear 202 (referring to FIG. 2A) around the yaw axis defined by the bearing 203 on the base to adjust the yaw angle of the gimbal. In one application scenario, the yaw angle can be in a range approximately between −330° and 330°. In other application scenarios, the yaw angle range may be different.

In some embodiments, the yaw axis assembly further includes a power supply circuit 305, a positioning circuit 306, a pointing circuit 307, and barometer (not shown). The power supply circuit 305 is configured to supply power to various structures. The positioning circuit 306 is configured to measure position information of the antenna assembly. The pointing circuit 307 is configured to indicate an azimuth angle of the antenna assembly. The barometer is configured to obtain height information of the antenna assembly. In one application scenario, the power supply circuit 305 further includes a power source 308 and a power source holder 309 to mount the power source 308 on the first bottom plate 302. The pointing circuit 307 further includes a mounting bracket 310, a carbon tube 311 fixed to the lower portion of the mounting bracket 310, and a compass 312. The positioning circuit 306 and the compass 312 both are fixed to the mounting bracket 310. The pointing circuit 307 is mounted at the first bottom plate 302. The positioning circuit 306 may be, but is not limited to, a GPS circuit or a Beidou circuit. In other embodiments, the barometer and the positioning circuit 306 are disposed outside the yaw axis assembly.

In some embodiments, the yaw axis assembly further includes an electric motor mounting bracket 313 for mounting the yaw axis electric motor 303 on the first bottom plate 302 and a heat sink 314 disposed at the mainboard 301 for heat dissipation.

In one application scenario, the mainboard 301 is mounted at the yaw axis assembly through a mainboard mounting bracket 315 and a bushing 316.

Figure 4:
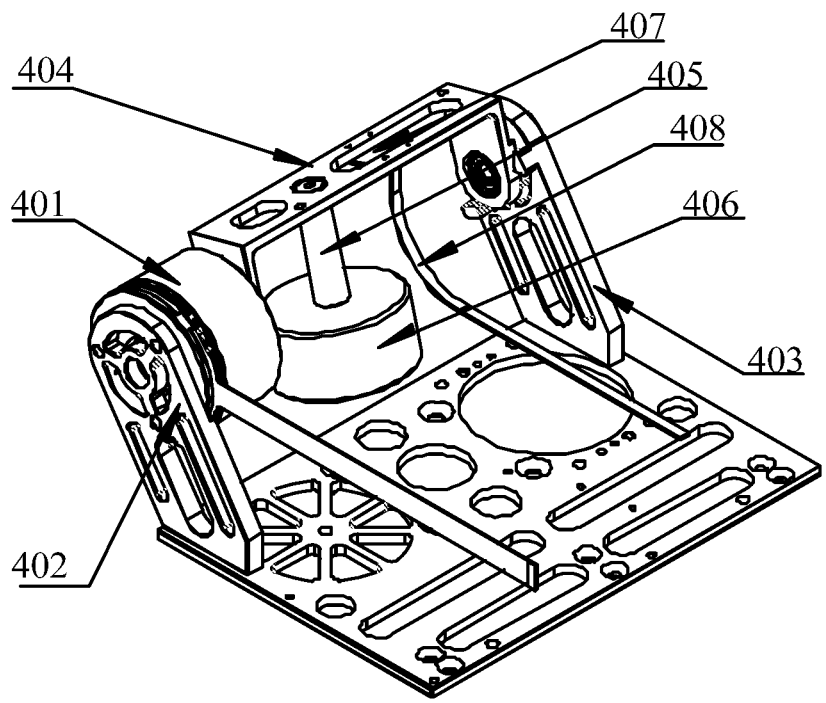
FIG. 4 is a schematic view of a pitch axis assembly of the gimbal in FIG. 1.

FIG. 4 is a schematic view of a pitch axis assembly of the gimbal in FIG. 1. The pitch axis assembly is configured to adjust the pitch angel of the gimbal. As shown in FIG. 4, the pitch axis assembly includes a pitch axis electric motor 401, a first bracket 402, a second bracket 403, and an antenna support member 404. The pitch axis electric motor 401 is disposed at the first bracket 402. The first bracket 402 and the second bracket 403 are separately fixed to the first bottom plate 302 of the yaw axis assembly (referring to FIG. 3). One end of the antenna support member 404 is rotationally supported on the second bracket 403. The other end of the antenna support member 404 is connected to the pitch axis electric motor 401. As such, driven by the pitch axis electric motor 401, the antenna support member 404 rotates around the pitch axis defined by the first bracket 402 and the second bracket 403 to adjust the pitch angle of the gimbal. In one application scenario, the pitch angle can be in a range approximately between −25° and 90°. In other application scenarios, the pitch angle range may be different.

In some embodiments, one side of the antenna support member 404 is fixed to the antenna 104 to support the antenna 104 (referring to FIG. 1), and the other side is mounted with a counterweight 406 through a counterweight mounting shaft 405 to balance the antenna support member 404, thereby reducing moment of inertia of the pitch axis assembly.

In some embodiments, the IMU 407 of the antenna assembly configured to measure the attitude of the gimbal is disposed at the pitch axis assembly. The IMU 407 is connected to the mainboard through a flexible circuit board 408, such that data of the measured attitude of the gimbal is transmitted to the mainboard.

For example, based on horizontal position information of the antenna assembly and horizontal position information of the UAV or based on a first control instruction generated from the horizontal position information of the antenna assembly and the horizontal position information of the UAV, the mainboard controls the yaw axis assembly to rotate around the yaw axis to adjust the yaw angle. Further, based on a horizontal distance and a height difference between the antenna assembly and the UAV or based on a second control instruction generated from the horizontal distance and the height difference between the antenna assembly and the UAV, the mainboard controls the pitch axis assembly to rotate around the pitch axis to adjust the pitch angle.

Different from the existing technology, the yaw axis assembly 105 and the pitch axis assembly 106 do not interfere with each other in the movement of the structures and cooperate with each other in the movement control, thereby providing technical support for changing the attitude of the gimbal.

Different from the existing technology, the yaw angle range can be from approximately −330° to approximately 330°, and the pitch angle range can be from approximately −25° to approximately 90°. In this case, while no dead zone exists above a plane of the bottom surface of the antenna assembly, a certain range for transmitting or receiving the UAV signal still exists below the plane of the bottom surface, thereby effectively extending the operating range of the UAV. Especially when the antenna is placed at a high position, the UAV located below the plane of the bottom surface of the antenna at a long distance may still transmit and receive high quality signals.

Figure 5:
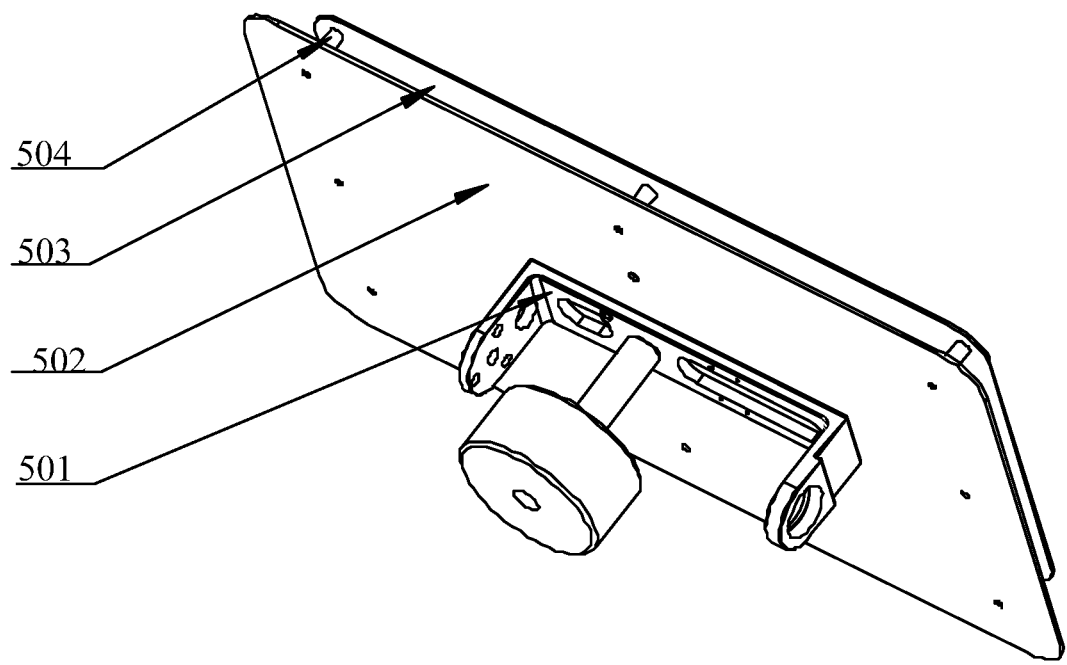
FIG. 5 is a schematic view of an antenna member of the antenna assembly in FIG.

FIG. 5 is a schematic view of an antenna of the antenna assembly in FIG. 1. As shown in FIG. 5, the antenna includes an antenna support member 501, an antenna bottom plate 502 disposed at the antenna support member 501, and an antenna array plate 503 disposed at the antenna bottom plate 502.

In some embodiments, the antenna operates in a first frequency band or a second frequency band.

In some embodiments, the first frequency band is around 2.4 GHz and the second frequency band is around 5.8 GHz. In some other embodiments, the first frequency band is around 5.8 GHz and the second frequency band is around 2.4 GHz.

In some embodiments, the antenna is a directional antenna or an omni-directional antenna.

In one application scenario, the antenna array plate 503 includes an internal integrated power amplifier to amplify the signal transmit power.

Different from the existing technology, the antenna supports 2.4 GHz and 5.8 GHz dual-band communication. The power gains thereof are greater than 12 dBi and 18 dBi, respectively. The antenna effectively extends the communication distance or improves the long distance communication quality, thereby increasing the smoothness and stability of the image or video signal transmission and reducing the communication delay.

In one application scenario, the antenna array plate 503 is fixed to the antenna support member 501 through a bushing 504.

Figure 6:
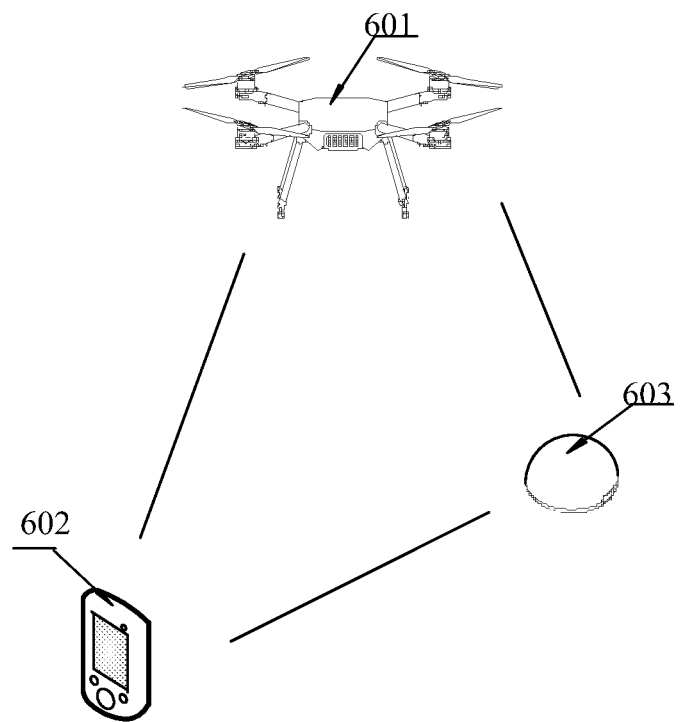
FIG. 6 is a schematic view of a UAV system according to an example embodiment of the present disclosure.

FIG. 6 is a schematic view of a UAV system according to an example embodiment of the present disclosure. As shown in FIG. 6, the UAV system includes a UAV 601, an external device 602, and an antenna assembly 603. The external device 602 sends a control signal to the antenna assembly 603. The antenna assembly 603 processes the control signal and sends the processed control signal to the UAV 601. The UAV 601 executes flight operation according to the processed control signal.

In one application scenario, the UAV 601 sends an image signal to the antenna assembly 603. The antenna assembly 603 processes the image signal by amplifying the image signal. The antenna assembly may also send the amplified image signal to the external device 602.

The external device 602 may include, but is not limited to, a remote controller, a wristband, a watch, VR glasses, a mobile phone, a tablet computer, or any combination thereof.

In one application scenario, the antenna assembly 603 processes a control signal by amplifying the control signal. The antenna assembly 603 may be stationary with respect to the external device 602 and may also be moving with respect to the external device 602, which is not limited by the present disclosure. In another application scenario, the antenna assembly 603 may be integrated in the external device 602.

The structure, the operation principle, and the function of the antenna assembly 603 have been described in detail in the embodiments of the present disclosure and will not be repeated herein.

During the operation of the UAV 601, the external device 602 sends the control instruction for controlling the operation of the UAV 601 to the antenna assembly 603. The antenna assembly 603 amplifies the control instruction and then sends the amplified control instruction to the UAV 601. The amplification principle has been described in detail in the embodiments of the present disclosure. The external device 602 may also send the control instruction for controlling the operation of the antenna assembly 603 to the antenna assembly 603.

In some embodiments, the external device 602 may also directly transmit signals to the UAV 601, which is not limited by the present disclosure.

Different from the existing technology, through adjusting the position of the antenna assembly 603 relative to the UAV 601, the antenna of the antenna assembly 603 points toward the UAV 601, thereby amplifying the control instruction transmitted to the UAV 601. Thus, the communication distance of the UAV is extended, and the communication quality of the distant UAV is improved.

The foregoing descriptions are merely some implementation manners of the present disclosure, but the scope of the present disclosure is not limited thereto. While the embodiments of the present disclosure have been described in detail, those skilled in the art may appreciate that the technical solutions described in the foregoing embodiments may be modified or equivalently substituted for some or all the technical features. And the modifications or substitutions do not depart from the scope of the technical solutions of the embodiments of the present disclosure.

What is claimed is:

1. An antenna assembly comprising:
    a base including:
        a housing;
        a feedline fixing platen fixedly disposed at the housing; and
        a feedline rotating platen rotationally disposed at the housing;
    a gimbal disposed at the base and including a yaw axis assembly and a pitch axis assembly;
    an antenna disposed at the gimbal; and
    a mainboard configured to control an attitude of the gimbal to control a radiation direction of the antenna;
    wherein:
        the feedline rotating platen is configured to rotate with the yaw axis assembly;
        the feedline fixing platen and the feedline rotating platen form a feedline receiving space to receive a feedline; and
        the yaw axis assembly is configured to drive the feedline rotating platen and the feedline to rotate synchronously with the yaw axis assembly.

2. The antenna assembly of claim 1, wherein the antenna assembly is configured to receive a control signal from an external device, amplify the control signal, and send the amplified control signal to an unmanned aerial vehicle (UAV).

3. The antenna assembly of claim 1, wherein the antenna is configured to operate in a frequency band around 2.4 GHz or a frequency band around 5.8 GHz.

4. The antenna assembly of claim 1, wherein:
    the attitude includes a yaw angle of the yaw axis assembly and a pitch angle of the pitch axis assembly;
    the yaw axis assembly includes a yaw axis electric motor; and
    the pitch axis assembly includes a pitch axis electric motor.

5. The antenna assembly of claim 4, further comprising:
    an inertial measurement unit (IMU) configured to measure the attitude.

6. The antenna assembly of claim 5, further comprising:
    a positioning circuit configured to measure position information of the antenna assembly; and
    a barometer configured to obtain height information of the antenna assembly.

7. The antenna assembly of claim 4, wherein the mainboard is configured to:
    control the yaw axis assembly to rotate around a yaw axis to adjust the yaw angle based on:
        horizontal position information of the antenna assembly and horizontal position information of an unmanned aerial vehicle (UAV), or
        a first control instruction generated from the horizontal position information of the antenna assembly and the horizontal position information of the UAV; and
    control the pitch axis assembly to rotate around a pitch axis to adjust the pitch angle based on:
        a horizontal distance and a height difference between the antenna assembly and the UAV, or
        a second control instruction generated from the horizontal distance and the height difference between the antenna assembly and the UAV.

8. The antenna assembly of claim 4, wherein:
    the base further includes a first drive gear and a bearing arranged at the housing, and a bottom plate support member rotatably supported by the bearing;
    the yaw axis assembly further includes:
        a first bottom plate supported by the bottom plate support member; and
        a second drive gear engaging with the first drive gear and configured to be driven by the yaw axis electric motor, the yaw axis electric motor being disposed at the first bottom plate; and the bottom plate support member and the first bottom plate are configured to be driven by the yaw axis electric motor to rotate relative to the housing of the base and the first drive gear around a yaw axis defined by the bearing.

9. The antenna assembly of claim 8, wherein:
the base further includes a limit slip ring disposed between the first drive gear and the bottom plate support member; and
the limit slip ring is configured to limit a rotation angle that the bottom plate support member rotates relative to the first drive gear.

10. The antenna assembly of claim 8, wherein:
the pitch axis assembly includes a first bracket, a second bracket, and an antenna support member;
the first bracket and the second bracket are fixed at the first bottom plate and are spaced apart from each other;
the pitch axis electric motor is disposed at the first bracket;
one end of the antenna support member is rotationally supported at the second bracket, and another end of the antenna support member is connected to the pitch axis electric motor;
the antenna support member is configured to be driven by the pitch axis electric motor to rotate around the pitch axis defined by the first bracket and the second bracket to adjust the pitch angle of the gimbal; and
the antenna is supported on the antenna support member.

11. The antenna assembly of claim 1, wherein the antenna includes:
an antenna array plate including an internal integrated power amplifier configured to amplify a control signal received by the antenna from an external device before transmitting the control signal to an unmanned aerial vehicle (UAV).

12. An unmanned aerial vehicle (UAV) system comprising:
a UAV;
an external device; and
an antenna assembly including:
a base including:
a housing;
a feedline fixing platen fixedly disposed at the housing; and
a feedline rotating platen rotationally disposed at the housing;
a gimbal disposed at the base and including a yaw axis assembly and a pitch axis assembly;
an antenna disposed at the gimbal; and
a mainboard configured to control an attitude of the gimbal to aim a radiation direction of the antenna towards the UAV;
wherein:
the feedline rotating platen is configured to rotate with the yaw axis assembly;
the feedline fixing platen and the feedline rotating platen form a feedline receiving space to receive a feedline;
the yaw axis assembly is configured to drive the feedline rotating platen and the feedline to rotate synchronously with the yaw axis assembly;
the external device is configured to send a control signal to the antenna assembly;

the antenna assembly is configured to process the control signal and send the processed control signal to the UAV; and
the UAV is configured to execute flight operation according to the processed control signal.

13. The UAV system of claim 12, wherein the external device includes at least one of a remote controller, a wristband, a watch, VR glasses, a mobile phone, or a tablet computer.

14. The UAV system of claim 12, wherein the antenna is configured to operate in a frequency band around 2.4 GHz or a frequency band around 5.8 GHz.

15. The UAV system of claim 12, wherein:
the attitude includes a yaw angle of the yaw axis assembly and a pitch angle of the pitch axis assembly;
the yaw axis assembly includes a yaw axis electric motor; and
the pitch axis assembly includes a pitch axis electric motor.

16. The UAV system of claim 15, wherein the antenna assembly further includes an inertial measurement unit (IMU) configured to measure the attitude.

17. The UAV system of claim 15, wherein:
the base further includes a first drive gear and a bearing arranged at the housing, and a bottom plate support member rotatably supported by the bearing;
the yaw axis assembly further includes:
a first bottom plate supported by the bottom plate support member; and
a second drive gear engaging with the first drive gear and configured to be driven by the yaw axis electric motor, the yaw axis electric motor being disposed at the first bottom plate; and
the bottom plate support member and the first bottom plate are configured to be driven by the yaw axis electric motor to rotate relative to the housing of the base and the first drive gear around a yaw axis defined by the bearing.

18. The UAV system of claim 17, wherein:
the base further includes a limit slip ring disposed between the first drive gear and the bottom plate support member; and
the limit slip ring is configured to limit a rotation angle that the bottom plate support member rotates relative to the first drive gear.

19. The UAV system of claim 17, wherein:
the pitch axis assembly includes a first bracket, a second bracket, and an antenna support member;
the first bracket and the second bracket are fixed at the first bottom plate and are spaced apart from each other;
the pitch axis electric motor is disposed at the first bracket;
one end of the antenna support member is rotationally supported at the second bracket, and another end of the antenna support member is connected to the pitch axis electric motor;
the antenna support member is configured to be driven by the pitch axis electric motor to rotate around the pitch axis defined by the first bracket and the second bracket to adjust the pitch angle of the gimbal; and
the antenna is supported on the antenna support member.

* * * * *